March 26, 1963  E. A. WENTZ  3,083,131
WEFTLESS FABRIC AND METHOD OF MAKING THE SAME
Filed Sept. 24, 1958

INVENTOR
Edward A. Wentz
BY
J. William Carson
ATTORNEY

United States Patent Office 3,083,131
Patented Mar. 26, 1963

3,083,131
WEFTLESS FABRIC AND METHOD OF
MAKING THE SAME
Edward A. Wentz, Cedar Grove, N.J., assignor to Specialties Development Corporation, Belleville, N.J., a corporation of New Jersey
Filed Sept. 24, 1958, Ser. No. 763,026
1 Claim. (Cl. 156—174)

The present invention relates to laminated fabric, and, more particularly, to manufacture of weftless fabric composed of resin impregnated fiber glass strands.

As disclosed in copending United States application Serial No. 747,756, filed July 10, 1958, assigned to the assignee hereof, hollow articles such as cones and the like can be fabricated by building up wall structure on a mandrel comprising successive layers of weftless sheets of resin impregnated warp strands of fiber glass in gel-cured state to maintain the sheets pliable, and hoop windings of resin impregnated yarn.

It has been found that the weftless sheets of warp strands can be made on a heated drum in about the same manner fabric for tires has been made in the past, namely, by winding successive closely spaced convolutions of resin impregnated fiber glass yarn about the drum and cutting the convolutions in the direction of the drum axis to obtain a sheet of warp strands adhered to adjacent strands by the resin.

However, by reason of the fact that the weftless sheet must be in gel-cured state to be useable in article fabricating processes, a number of difficulties have been encountered.

One of the difficulties was that the weftless sheet could not be stripped cleanly from the rigid surface of the drum in every instance, whereby at least a portion of the sheet was unfit for use and had to be discarded and the drum surface had to be cleaned frequently after the winding and stripping operations. The attendant disadvantages of material and labor costs by reason of this difficulty were intolerable.

Accordingly, an object of the present invention is to provide a method of making such weftless sheets which is not subject to the foregoing difficulties and disadvantages.

Another object is to provide a method of making such weftless sheets which enables the sheets to be readily removed from the drum.

A further object is to accomplish the foregoing in a simple, practical and extremely economical manner.

Other and further objects of the invention will be obvious upon an understanding of the illustrative embodiment about to be described, or will be indicated in the appended claim, and various advantages not referred to herein will occur to one skilled in the art upon employment of the invention in practice.

In accordance with the present invention, the foregoing objects are generally accomplished by covering the surface of the drum or other rotatable form with a pliable sheet of material, hoop winding successive convolutions of resin impregnated fiber glass yarn about the form and on the pliable sheet, gel-curing the resin to provide a tubular sheet on the form in pliable condition, cutting the tubular sheet along a line extending in the general direction of the axis of rotation of the form to provide a weftless sheet, and removing the weftless sheet from the pliable sheet and the form.

A preferred embodiment of the invention has been chosen for purposes of illustration and description, and is shown in the accompanying drawing, forming a part of the specification, wherein.

Figure 1:
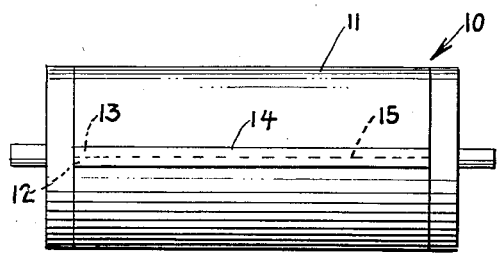
FIG. 1 is a schematic plan view of a drum having its surface covered with a pliable sheet.

Referring to FIG. 1 of the drawing in detail, there is shown schematically a drum 10 mounted for rotation and provided with internal heating means (not shown), and a sheet 11 of pliable material wrapped about the surface of the drum to cover the same.

The sheet 11 is attached to the drum by securing the adjacently opposite edge portions 12 and 13 together by a strip 14 of metal which overlies the sheet and which is secured to the drum in any suitable manner, for example by taping or adhesively securing the strip 14 to the drum 10 and/or the sheet 11 (not shown). The broken line 15 indicates the line along which the opposite edges of the strip are adjacent each other. Preferably, this line is disposed in a plane passing through the axis of rotation of the drum.

The sheet 11 may be formed of any pliable material adapted to withstand temperatures up to about 250° F., such as metal foil, cellophane, paper, heat resisting polyesters. Sheets formed of a polyester resin, such as polyethylene terephthalate sold under the trade name Mylar, may be employed because they are pliable, durable, heat resistive and do not adhere to the weftless sheets of gel-cured resin impregnated warp strands whereby the latter are readily stripped without damage to either sheet.

Figure 2:
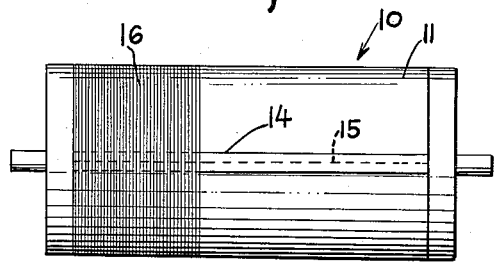
FIG. 2 is a schematic plan view of the drum during the application of the hoop windings.

In FIG. 2, the drum 10 is shown with closely adjacent successive convolutions of freshly resin impregnated fiber glass yarn partially wound onto the pliable sheet 11 by using a slow moving transverse. Such winding is continued until the sheet is covered with a layer 16 of hoop windings which provide a tubular article. If desired, as many as four or more layers of such windings may be applied depending upon the use for which the final product is intended.

During the application of the hoop windings, the windings are wiped as they are formed with the application of slight pressure to remove excess resin and to thereby provide for better control of the glass to resin ratio in the final product.

While the drum may be heated while the winding is being applied, it is preferred to heat the drum after the winding has been completed so that the resulting sheet is uniformly gel-cured. This may be accomplished by heating the drum to between about 175° and about 250° F. for about 15 to about 25 minutes, the time and temperature being such that the sheet remains pliable, for example 20 minutes at 200° F.

Figure 3:
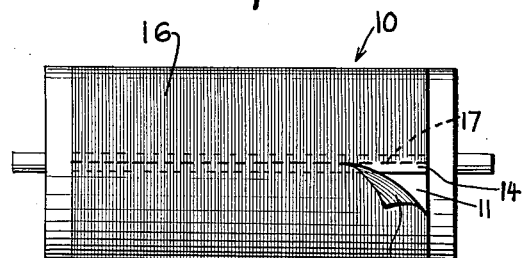
FIG. 3 is a schematic plan view of the drum after the hoop windings have been applied and the weftless sheet has been cut and partially stripped from the drum.
Figure 4:
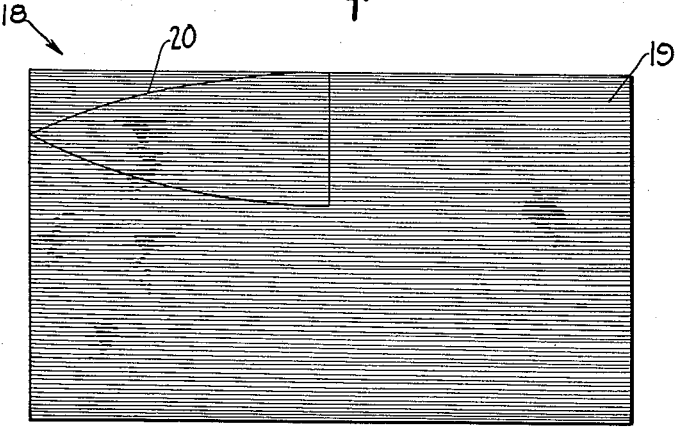
FIG. 4 is a plan view of the weftless sheet after being removed from the drum.

When the layer or layers of windings 16 have been gel-cured for about 20 minutes, the convolutions are cut along the broken line 17 extending across the metal strip 14 which prevents the sheet 11 from being cut (FIG. 3). The sheet 19 of gel-cured resin impregnated warp strands can now be readily stripped from the sheet 11, while the sheet 11 remains on the drum for further use. The stripped sheet 19 can then be cut into forms 20 (FIG. 4) of any desired shape or size.

Any suitable resin and fiber glass yarn may be employed depending upon the ultimate use of the sheets 19. As a specific example, the sheet 19 may comprise a single winding composed of seventy adjacently grouped ends of fiber glass yarn, for example, containing a silicone type binder and being impregnated with a heat resisting polyester resin such as triallyl cyanurate. In such case, the sheet of gel-cured resin impregnated fiber glass warp yarns comprises about 80% glass and about 20% resin.

From the foregoing description, it will be seen that the present invention provides pliable weftless sheets of gel-cured resin impregnated fiber glass warp strands which sheets are made in a simple, practical and economical manner.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

The method of making a weftless sheet which method comprises covering the entire peripheral surface of a rotatable form with a pliable sheet of material to which heat curable resin will not adhere and which is adapted to withstand the temperatures at which the resin is heat cured, the sheet having two opposite lineal edges adjacently disposed, applying a cut resistive metallic fastening strip to the form overlying the adjacent edges to secure the pliable sheet on the form, hoop winding successive convolutions of resin impregnated fiber glass yarn about the form and on the pliable sheet by rotating the form, gel-curing the resin to provide a tubular article on the form in pliable condition which article is composed solely of fiber glass yarn and resin, cutting the tubular article along a straight line extending in the general direction of the axis of rotation of the form and between the opposite edges of the fastening strip to provide a weftless sheet, removing the pliable weftless sheet from the pliable sheet and the form, and leaving the pliable sheet on the form for subsequent forming a pliable weftless sheet thereon.

References Cited in the file of this patent

UNITED STATES PATENTS

| | | |
|---|---|---|
| 2,537,126 | Francis | Jan. 9, 1951 |
| 2,723,705 | Collins | Nov. 15, 1955 |
| 2,726,185 | Howald | Dec. 6, 1955 |
| 2,731,376 | Rusch | Jan. 17, 1956 |
| 2,813,052 | Lancaster | Nov. 12, 1957 |

OTHER REFERENCES

Teflon—Properties and Uses, August 1957 (Du Pont Publication—Polychemicals Dept.), section on non-adhesive applications appearing at page 13.